United States Patent [19]

Paradise, Jr. et al.

[11] 4,230,732
[45] Oct. 28, 1980

[54] METHODS OF CHILLING POULTRY

[75] Inventors: William L. Paradise, Jr., Dunwoody, Ga.; Mark L. Byars, Berkeley Heights, N.J.

[73] Assignee: Airco, Inc., Montvale, N.J.

[21] Appl. No.: 6,150

[22] Filed: Jan. 24, 1979

[51] Int. Cl.$^2$ .................. A23L 1/315; B65B 25/00
[52] U.S. Cl. ........................ 426/393; 17/45; 53/434; 53/440; 62/62; 426/282; 426/410; 426/480; 426/524
[58] Field of Search ............... 426/393, 524, 644, 282, 426/480, 410; 17/11, 45; 62/62; 53/434, 440

[56]  References Cited

U.S. PATENT DOCUMENTS

| | | | |
|---|---|---|---|
| 1,797,606 | 3/1931 | Crider | 62/62 |
| 2,174,649 | 10/1939 | Bailey | 426/524 X |
| 2,231,886 | 2/1941 | Crider | 426/524 X |
| 2,314,317 | 3/1943 | Walter | 426/524 |
| 3,022,646 | 2/1962 | Zebarth et al. | 17/11 |
| 3,359,122 | 12/1967 | Zebarth et al. | 426/393 |
| 3,540,074 | 11/1970 | Lawson | 17/11 |
| 3,623,892 | 11/1971 | Koonz et al. | 17/11 |
| 3,708,312 | 1/1973 | Malinow | 426/129 |
| 3,932,155 | 1/1976 | Pietrucha et al. | 62/63 |

FOREIGN PATENT DOCUMENTS 2262914  11/1975  France ............... 426/644

OTHER PUBLICATIONS

Broiler Industry, 6/76, "Gas Flush Packaging Booms Wilson's Sales", pp. 14, 16, etc..

*Primary Examiner*—Steven L. Weinstein
*Attorney, Agent, or Firm*—David L. Rae; Larry R. Cassett; Edmund W. Bopp

[57] ABSTRACT

Dressed poultry without giblets in the breast cavity are chilled in an ice water bath or the like to 32°–35° F. The giblets are frozen and are then inserted into the carcass thereby providing refrigeration and enabling shelf life of the carcass to be maintained for up to 30 days or greater without the use of water ice or dry ice in packing cartons.

4 Claims, No Drawings

METHODS OF CHILLING POULTRY

BACKGROUND OF THE INVENTION

The present invention relates to chilling poultry and, more particularly, to the chilling of chicken such that prolonged shelf life may be obtained.

In order to meet a continuing retail demand for fresh, as opposed to frozen poultry, it is necessary to eviscerate and dress poultry such as chicken and to maintain the same at suitable temperatures prior to retail sale. Typically, dressed chicken is chilled to and maintained at a temperature of 32°–35° F. at which growth of bacteria (i.e. spoilage) is strongly retarded. In this manner, chicken is preserved in a 'fresh' condition as it is transported, distributed and placed on shelves for retail sale. Clearly, the longest shelf life which can be readily obtaned is desired to avoid lost sales due to spoilage of the poultry product.

In a typical poultry processing plant, chickens are prepared for shipment by chilling to a temperature of 32°–35° F., generally in an ice water bath. It is common practice in dressing chickens to automatically remove parts comprising the giblets, eviscerate the carcass and reinsert the giblets. In fact, in large chicken processing plants, economics dictate that virtually all such operations be automated and equipment for so automating chicken processing is commercially available.

It is also common practice to package dressed chickens for shipment by placing a dozen or so chilled chickens in a carton and then cover such chickens with water ice before sealing the carton. The use of water ice adds to the net weight of shipped poultry and thereby increases transport costs as well as resulting in the inconvenience of handling cartons which inevitably become wet with melted water ice. It is also known to pack dressed poultry with dry ice (solid carbon dioxide) and although the problems of melting water ice are avoided, dry ice is more costly and still adds to the net weight and hence cost of shipping the poultry product. Charges of dry ice may be injected into poultry carcasses as described in U.S. Pat. No. 3,932,155, which is assigned to the assignee of the present invention, but these techniques have resulted in damage to the carcasses due to the high $CO_2$ injection pressures utilized.

In order to avoid the aforementioned problems of maintaining poultry in a chilled condition, it has been proposed to insert chilled poultry in gas flushed bags and simply ship such bags in standard cartons. In this packaging process, a vacuum withdraws ambient atmosphere from the bags prior to introducing an inert gas such as carbon dioxide. The chilled poultry, say 10–12 chickens, is then placed in the bag which is typically comprised of a plastic material. The bags are heat sealed to retain the inert atmosphere ($CO_2$) therein and shelf lives of 20–22 days have been obtained for poultry so packaged.

It has been found that poultry such as chicken chilled or refrigerated in cartons packed with dry or water ice, or chickens placed in gas flushed bags, tend initially to develop the evidence of spoilage internally of the carcass, i.e. the walls of the breast cavity. The above mentioned chilling techniques, with the exception of the process described in U.S. Pat. No. 3,932,155, do not result in the introduction of any significant quantities of refrigerant internally of the poultry carcass and relatively short, say 10–22 day shelf life results. Although the process described in the above mentioned U.S. Patent enables introduction of $CO_2$ snow internally of poultry carcasses, such techniques cause a discharge of snow at pressures which frequently physically damage the poultry being chilled. Also, as carbon dioxide snow exhibits a temperature of $-109°$ F., the interior portions of poultry are frozen by use of the process described in this patent.

During the transport of poultry packaged by any of the techniques described above, the desired temperature of a trailer is established and typically maintained by a mechanical refrigeration unit. In the past, there has been a tendency to operate trailer refrigeration units at temperatures so that the average temperature of transported poultry is not just maintained but is actually reduced to a satisfactory level. However, there have been instances in which trailer refrigeration systems have not been adequate to effect such temperature reductions and loads of dressed poultry have been 'rejected' at their destination for failure to arrive at or below a prescribed maximum temperature.

Accordingly, a clear need exists for an effective poultry chilling process which enables increased shelf life to be obtained without the inconvenience associated with water ice chilling techniques and which is compatible with automated poultry processing lines.

OBJECTS OF THE INVENTION

It is an object of the present invention to provide improved methods for chilling poultry.

It is another object of the present invention to provide a poultry chilling process which enables extended shelf life of fresh poultry to be obtained.

It is yet a further object of the present invention to provide an improved poultry chilling process which is fully compatible with existing automated poultry processing equipment.

It is a further object of the present invention to provide a poultry chilling process which does not require use of water or dry ice in packing cartons.

It is still another object of the present invention to provide a poultry chilling process in which weepage is reduced.

Other objects of the present invention will become apparent from the detailed description of an exemplary embodiment thereof which follows, and the novel features will be particularly pointed out in conjunction with the claims appended hereto.

SUMMARY

In accordance with the invention, dressed poultry carcasses without giblets are chilled to an average temperature between about 32°–35° F., poultry parts comprising the giblets are frozen and are inserted into each of said chilled poultry carcasses thereby providing refrigeration to, but without freezing interior sections of, the carcass. The refrigeration provided by such frozen giblets enables the desired temperatures of 32°–35° F. to be maintained for poultry packed in cartons without requiring the use of water or dry ice. The poultry chilled in accordance with the present invention may comprise chicken or other fowl and may be sold at the retail level as 'fresh' as opposed to frozen poultry. The poultry parts comprising giblets may be automatically removed from poultry such as chickens, frozen and inserted into the chicken by equipment presently commercially available. Chilled poultry containing frozen giblets may be packaged in gas flushed bags before insertion into standard packing cartons for shipment. Also, due to the refrigeration provided by the frozen giblets, the dependency upon trailer refrigeration systems to reduce product temperatures is relieved and such systems may operate at higher temperatures thus resulting in lower shipping costs.

DESCRIPTIONS OF PREFERRED EMBODIMENT

Poultry products such as chickens which are to be chilled by the method according to the present invention are picked and eviscerated in the accepted industry manner. This processing which includes removal of the liver, neck, heart and gizzard portions which comprise the giblets will not be described in detail as such processing forms no part of the present invention.

The fully dressed poultry product without giblets is initially chilled to a temperature of about 32° F., and preferably to a temperature no greater than 35° F. Although the lower the temperature to which poultry is chilled, the longer is the shelf life likely to be, it is important that the poultry carcass not be frozen. In order to sell poultry as 'fresh' poultry and to facilitate packing in cartons holding, say 10–12 chickens, the poultry carcasses must not be frozen. Therefore, it is desirable to chill poultry to, and maintain a temperature of, about 32° F. in order to maximize shelf life. The dressed poultry products without giblets are chilled in an ice-water bath or by other suitable means. The giblets are frozen by subjecting the same to mechanical regrigeration, solid carbon dioxide (snow) or liquid nitrogen. The frozen giblets are inserted into the breast cavity and thereupon provide refrigeration to the poultry product which may then be packaged in gas flushed bags and in cartons as mentioned above. Suitable equipment for automatically removing and reinserting giblets from the breast cavities of poultry products is commercially available from Gainesville Machine Co., Gainesville, Ga. while gas flushing systems are available from CVP Equipment, Lombard, Illinois.

In the course of freezing giblets, carbon dioxide refrigeration may be utilized. For example, giblets may be passed on a conveyor through a tunnel into which liquid $CO_2$ is dispensed under pressure thereby converting such liquid to solid (snow) and vapor. The giblets should be frozen although it will be understood that giblet core temperatures may be approximately 38°–40° F. upon reinsertion into breast cavities as long as the giblets may equilibrate to a temperature below 32° F. Such giblets may equilibrate to a temperature of approximately 28° F. and still provide adequate refrigeration of poultry products without freezing the same. It has been found that when chicken is chilled by the process according to the invention and packaged in gas flushed bags, a shelf life of 31 days has been obtained without the use of water or dry ice in packing cartons. Of course, during shelf life, such chickens are maintained as far as possible in a refrigerated condition at standard temperatures, i.e. 32°–35° F.

In addition to the aforementioned benefits obtained in the course of chilling poultry in accordance with the invention it has been found that "weepage" or the loss of poultry fluid during shelf life is reduced when such poultry contains frozen giblets.

In summary, the process for chilling fresh poultry in accordance with the present invention enables extended shelf life to be obtained without freezing poultry carcasses while at the same time permitting increased shipping weight per carton as the need for dry or water ice in such cartons is avoided. In addition, transport vehicle refrigeration systems will not be required to reduce temperature of chilled poultry during transport.

The foregoing and other various changes in form and details may be made without departing from the spirit and scope of the present invention. Consequently, it is intended that the appended claims be interpreted as including all such changes and modifications.

We claim:

1. A process for chilling poultry comprising the steps of: removing parts of the poultry comprising the giblets from said poultry, chilling said poultry without said giblets to a temperature of about 32°–35° F. without freezing said poultry, freezing said giblets while removed from said poultry such that the average temperature of said giblets is reduced to about 28° F. or lower; and reinserting said frozen giblets into the breast cavity of said chilled poultry to thereby provide refrigeration to said chilled, but unfrozen, poultry to enable extended shelf life thereof without freezing portions of said poultry other than said giblets.

2. The process defined in claim 1 wherein said poultry comprises chicken and said step of chilling poultry comprises immersing said chicken in an ice water bath.

3. The process defined in claim 2 additionally comprising the step of packing said frozen giblet containing chilled, but unfrozen, chickens in packing cartons without the addition of water or dry ice to said carton.

4. The process defined in claim 3 additionally comprising the steps of withdrawing the atmosphere from a heat sealable plastic bag, flushing said plastic bag with an inert gas, and before said step of packing said frozen giblet containing chickens in packing cartons, inserting about 10–12 of said frozen giblet containing chilled, but unfrozen, chickens in said bag while the same is flushed with said inert gas and heat sealing said plastic bag to retain said chickens and said inert gas therein.

* * * * *

UNITED STATES PATENT AND TRADEMARK OFFICE
CERTIFICATE OF CORRECTION

PATENT NO. : 4,230,732
DATED : October 28, 1980
INVENTOR(S) : WILLIAM L. PARADICE, JR. and MARK L. BYARS It is certified that error appears in the above-identified patent and that said Letters Patent are hereby corrected as shown below:

First page, under Inventors: the first inventor's name is incorrectly spelled as "Paradise" and should be --Paradice--.

Column 1, line 18, "taned" should read --tained--.

Signed and Sealed this

Third Day of February 1981

[SEAL]

Attest:

RENE D. TEGTMEYER

Attesting Officer

Acting Commissioner of Patents and Trademarks